(12) United States Patent
Riffault

(10) Patent No.: US 8,784,718 B2
(45) Date of Patent: Jul. 22, 2014

(54) VULCANISING PRESS FOR A TIRE BLANK INCLUDING A TILTABLE LID

(75) Inventor: Patrick Riffault, Cebazat (FR)

(73) Assignees: Compagnie Generale des Etablissements Michelin, Clermont-Ferrand (FR); Michelin Recherche et Technique S.A., Granges-Paccot (CH)

(*) Notice: Subject to any disclaimer, the term of this patent is extended or adjusted under 35 U.S.C. 154(b) by 71 days.

(21) Appl. No.: 13/512,528

(22) PCT Filed: Nov. 24, 2010

(86) PCT No.: PCT/FR2010/052511
§ 371 (c)(1),
(2), (4) Date: Oct. 2, 2012

(87) PCT Pub. No.: WO2011/064499
PCT Pub. Date: Jun. 3, 2011

(65) Prior Publication Data
US 2013/0119583 A1 May 16, 2013

(30) Foreign Application Priority Data
Nov. 27, 2009 (FR) ...................................... 09 58454

(51) Int. Cl.
*B29C 33/20* (2006.01)

(52) U.S. Cl.
USPC ............................ 264/326; 425/47; 425/450.1

(58) Field of Classification Search
USPC .......................... 425/34.3, 47, 450.1; 264/326
See application file for complete search history.

(56) References Cited

U.S. PATENT DOCUMENTS

| 2,028,618 | A | * | 1/1936 | Macbeth | 425/47 |
| 2,200,871 | A | * | 5/1940 | Bosomworth | 425/47 |
| 2,240,010 | A | * | 4/1941 | Bosomworth | 425/47 |
| 2,270,817 | A | * | 1/1942 | Allen | 425/47 |
| 2,308,948 | A | * | 1/1943 | Bosomworth | 425/47 |
| 2,495,663 | A | | 1/1950 | Soderquist | |
| 2,638,629 | A | * | 5/1953 | Meintz | 425/47 |
| 2,809,396 | A | | 10/1957 | Ernst | |
| 2,851,726 | A | * | 9/1958 | Eriksen | 425/47 |
| 3,241,190 | A | * | 3/1966 | Laudisa | 425/47 |
| 4,360,335 | A | | 11/1982 | West | |
| 5,866,170 | A | * | 2/1999 | Fujieda et al. | 425/47 |

FOREIGN PATENT DOCUMENTS

| DE | 10 27 392 | 4/1958 |
| DE | 11 20 116 | 12/1961 |
| GB | 989 203 | 4/1965 |

* cited by examiner

*Primary Examiner* — James Mackey
(74) *Attorney, Agent, or Firm* — Cozen O'Connor

(57) ABSTRACT

The curing press (2) for a tire blank comprises: a trough (4), a cover (6) connected to the trough by means of sliding guide members (8), the cover and the trough each being pivotably mounted on these members. The cover (6) is, moreover, pivotably mounted on an axle (24) guided slidably with respect to the trough.

9 Claims, 1 Drawing Sheet

VULCANISING PRESS FOR A TIRE BLANK INCLUDING A TILTABLE LID

RELATED APPLICATIONS

This is a U.S. National Phase Application under 35 USC 371 of International Application PCT/FR2010/052511 filed on Nov. 24, 2010.

This application claims the priority of French application Ser. No. 09/58454 filed Nov. 27, 2009, the entire content of which is hereby incorporated by reference.

FIELD OF THE INVENTION

The invention is concerned with curing presses for tire blanks.

BACKGROUND OF THE INVENTION

It is known practice to cure a green tire blank in a press in order to shape it and to vulcanize it. The press comprises a trough and a cover connected to the trough by means of slides that allow it to slide vertically. The slides are pivotably mounted on the trough. To open the press, the cover is slid upwardly to move it away from the trough and then the slides are tilted in order to move the cover out of the way so as to allow access to the trough.

In this arrangement, the free height between the trough and the cover is limited by the vertical displacement of the latter. To open up as far as possible the space required to gain access to the trough in order to load the moulds and the tires, the slides must be tilted through a pronounced angle. That involves a considerable expenditure of energy and generates a substantial space requirement on that side of the press where the cover tilts.

SUMMARY OF THE INVENTION

One object of the invention is to facilitate access to the trough without increasing either the energy expenditure or the space requirement of the machine.

Accordingly, one aspect of the invention provides a curing press for a tire blank, which comprises:

a trough, a cover connected to the trough by means of sliding guide members, the cover and the trough each being pivotably mounted on these members, the cover being, moreover, pivotably mounted on an axle guided slidably with respect to the trough.

Thus, after the cover has been slid upwards, and while the sliding guide members are tilting, the slidably guided axle causes the cover to be additionally tilted with respect to the trough, thereby opening up the space above said trough. Without modifying the length of the sliding travel of the cover above the trough, the free height available between the trough and the cover is considerably increased. In parallel, this greater height is obtained without increasing the tilting angle of the guide members, or even while reducing this angle. By virtue of this arrangement, it is also possible to reduce the travel of the actuators which manoeuvre the sliding guide members and to reduce the force that they generate. Finally, not only does the invention not increase the space requirement of the machine on that side where the cover tilts but it also allows a reduction thereof.

Advantageously, the axle extends lower than an axle connecting the cover to the sliding guide members. Thus, the additional axle causes the cover to be tilted in the same direction as it is tilted by the manoeuvring of the sliding guide members, thereby freeing up access to the opening above the trough all the more.

The press according to an embodiment of the invention may additionally have at least any one of the following features:

the press comprises a rail for guiding the axle;

it comprises an element for rectilinearly and/or vertically guiding the axle;

it comprises a connecting rod rigidly fixed to the cover and bearing the axle;

it comprises at least one actuator capable of pivoting the sliding guide members with respect to the trough;

the axle extends on one and the same side of the press as the actuator; and the sliding guide members each comprise a rod slidably mounted in a sleeve.

Another aspect of the invention provides a method for opening a curing press for a tire blank, in which:

a cover of the press is slid upwardly with respect to a trough of the press;

members for connecting the cover to the trough are tilted; and the cover is tilted with respect to the connecting members.

BRIEF DESCRIPTION OF THE DRAWINGS

Other features and advantages of the invention will become apparent from the following description of an embodiment given by way of non-limiting example with reference to the appended drawings, in which.

DETAILED DESCRIPTION OF THE DRAWINGS

Use is made here of an X, Y and Z orthogonal reference system in which the X and Y directions are horizontal and perpendicular to one another, with the Y direction being perpendicular to the plane of the figures, and the Z direction, which is perpendicular to the X and Y directions, represents the vertical direction.

Figure 1:
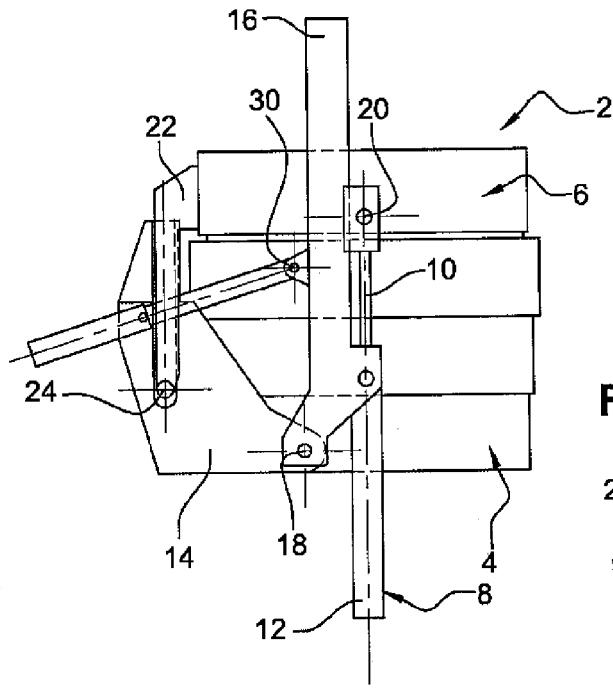
FIGS. 1 to 3 show a press according to the invention during three stages of the opening movement of the press after curing.
Figure 2:
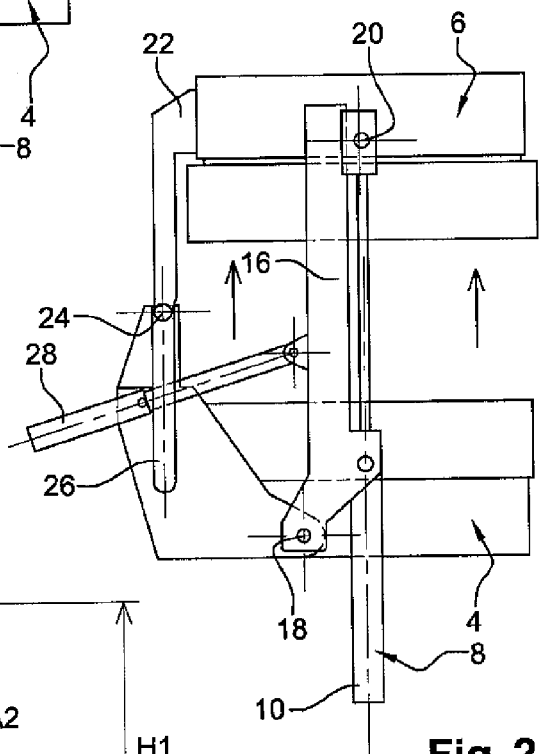
Figure 3:
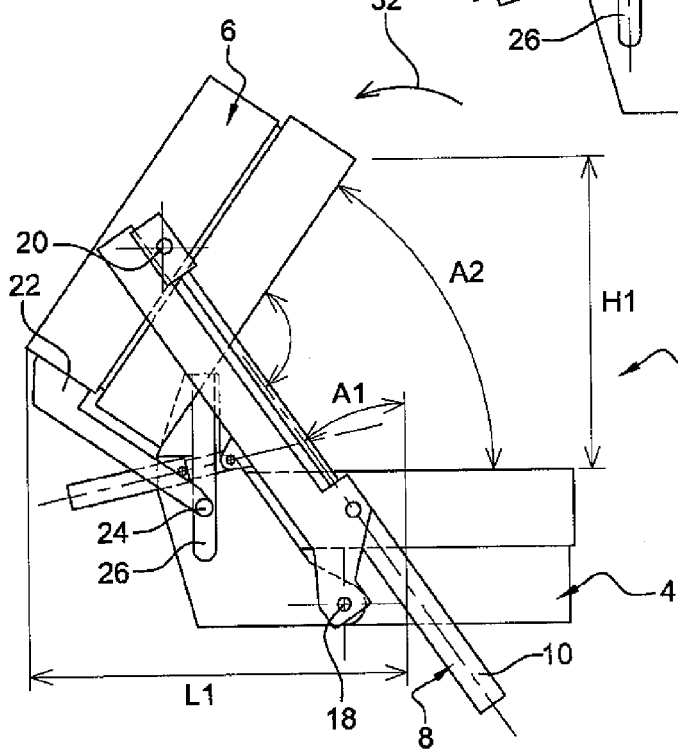

FIGS. 1 to 3 illustrate a press 2 according to the invention. This is a curing press for the vulcanization of green tire blanks for light/lightweight, heavy goods or civil engineering type vehicle wheel.

The press 2 comprises a trough 4 intended to receive the curing mould which itself receives the blank and/or the tires. This trough thus forms a hollow receptacle which is open to the top. The press comprises means for curing, in particular by circulating a heat-transfer fluid, which have not been detailed.

The press comprises a cover 6 designed to close off an upper opening of the trough. It also comprises means for locking the press in a closed position.

The press comprises two members 8 which serve to guide the cover 6 with a sliding motion with respect to the trough 4. These members are situated one on either side of the trough. The one which is visible in the figures at the front of the trough and the cover masks the other, which is situated on the other side of the trough and the cover. Each guide member 8 in this instance comprises a rod 10 slidably mounted in a guide sleeve 12 which is coaxial to the rod.

The press comprises a clevis 14 which is rigidly fixed to the trough 4 and which extends at the rear thereof.

For each member 8, the press comprises an arm 16 rigidly fixed to the sleeve 12 at an upper end of the sleeve. The arm 16 is pivotably mounted on the trough 4 by being mounted directly on the clevis 14 so as to be able to pivot about an axle 18 parallel to the Y direction.

The rod 10 is directly mounted on the cover 6 so as to be able to pivot about an axis of rotation 20 parallel to the Y direction. The axis passes through a vertical mid-plane of the cover.

The cover bears a connecting rod 22 rigidly fastened to a rear side of said cover. The connecting rod 22 has an overall rectilinear shape. At its lower end, the connecting rod has a shaft 24 forming an axis of rotation parallel to the Y direction. The press 2 comprises means for slidably guiding this shaft with respect to the trough 4. These means are formed, in the present example, by a rail or a vertical rectilinear slide 26 formed in the clevis 14 and hence fixed rigidly to the trough 4.

The press 2 comprises means for manoeuvring the arm 16, these means being formed in this instance by actuators consisting of cylinder actuators 28 whose distal end is directly pivotably mounted on a central portion of the arm 16. The axis of rotation 30 thereof extends above the axle 18 and below the axle 20.

All of the aforementioned axes of rotation/axles are parallel to the Y direction.

We will now show the operation of the press and the method according to the invention.

In FIG. 1, the press is in the configuration which it occupies during the curing process. The cover 6 closes the trough 4. The rod 10, the sleeve 12 and the connecting rod 22 are vertical, as is the arm 16. The rod 10 is in its position in which it is most retracted into the sleeve 12.

With reference to FIG. 2, in order to open the press, the sliding guide members 8 are first of all actuated using means (not shown) so as to make the cover 6 slide upwardly with respect to the trough 4. Therefore, the movement at this stage is a translational movement.

Once the cover 6 has reached the upper limit of its sliding travel, the cylinder actuators 28 are actuated so as to push the arms 16 rearwards, that is to say towards the left in FIG. 2. This action causes the assembly formed by the arms 16 and each member 8 to rotate about the axle 18, i.e. in the anti-clockwise direction in the figures, as indicated by the arrow 32. This rotation, for its part, results in the assembly formed by the cover 6 and the connecting rod 22 pivoting about the axle 24, and simultaneously results in this axle sliding downwards within the slide 26. This additional rotation of the cover is caused by the cooperation between this axle and this slide. It follows that the cover is rotated relative to the sliding guide members 8 about the axle 20. Moreover, the movement of the cover relative to the trough 4 that is caused by the cylinder actuators is no longer reduced to a simple rotational movement. In fact, the movement of the cover is this time composed of a rotational movement and a translational movement.

Thus, the angle A2 formed between the underside of the cover and the upper side of the trough is greater than in the prior art. Similarly, if H1 is used to designate the height between the uppermost point of the underside of the cover and the upper side of the trough, a greater height than in the prior art is obtained. Better access to the trough is thus achieved, making it possible for the curing moulds and the casings to be loaded more easily into the press. Simultaneously, the tilting angle A1 of the members 10 with respect to the initial vertical direction can be reduced with respect to the tilting angle required in the prior art. It is also possible to reduce the travel of the cylinder actuators 28 and the thrust force produced. The same is true for the space requirement of the machine at its rear, namely on the left in the figures, measured for example by the length L1 separating the rearmost point of the upper side of the open cover and the principal vertical axis of symmetry of the trough.

Therefore, the invention makes it possible to pivot the cover 6 around the axle 20 connecting it to the sliding members 8 during the rearward-tilting stage, thereby increasing the relative angle A2 between the cover and the trough without increasing either the tilting angle A1 or the tilting travel.

Of course, many modifications may be made to the invention without departing from the scope thereof. The position of the various axes/axles may be modified. The construction of the sliding guide means may be modified, with systems employing rails, linkages, etc. being provided. The travel of the axle 24 during the tilting movement of the cover may be non-vertical and/or non-rectilinear.

The invention claimed is:

1. A curing press for a tire blank comprising:
   a trough;
   a cover connected to the trough by sliding guide members, the cover and the trough each being pivotably mounted on these members, the cover being pivotably mounted on an axle guided slidably with respect to the trough; and
   at least one actuator capable of pivoting the sliding guide members with respect to the trough and directly pivotably mounted on the sliding members.

2. The press according to claim 1, wherein the axle extends lower than an axle connecting the cover to the sliding guide members.

3. The press according to claim 1, further comprising a rail for guiding the axle.

4. The press according to claim 1, further comprising an element for rectilinearly guiding the axle.

5. The press according to claim 1, further comprising an element for vertically guiding the axle.

6. The press according to claim 1, further comprising a connecting rod rigidly fixed to the cover and bearing the axle.

7. The press according to claim 1, wherein the axle extends on one and the same side of the press as the actuator.

8. The press according to claim 1, wherein the sliding guide members each comprise a rod slidably mounted in a sleeve.

9. A method for opening a curing press for a tire blank, wherein:
   a cover of the press is slid upwardly with respect to a trough of the press;
   members for connecting the cover to the trough are tilted by means of at least one actuator directly pivotably mounted on the members; and
   the cover is tilted with respect to the connecting members.

* * * * *